(12) United States Patent
Dispensa et al.

(10) Patent No.: US 10,084,705 B2
(45) Date of Patent: Sep. 25, 2018

(54) LOCATION IDENTIFICATION OF PRIOR NETWORK MESSAGE PROCESSOR

(71) Applicant: Microsoft Technology Licensing, LLC, Redmond, WA (US)

(72) Inventors: Stephen T. Dispensa, Mercer Island, WA (US); Hervey Wilson, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 300 days.

(21) Appl. No.: 14/929,081

(22) Filed: Oct. 30, 2015

(65) Prior Publication Data
US 2017/0126562 A1 May 4, 2017

(51) Int. Cl.
| H04L 12/801 | (2013.01) |
| H04L 12/58 | (2006.01) |
| G06F 15/16 | (2006.01) |
| H04L 9/32 | (2006.01) |
| G06F 7/04 | (2006.01) |
| H04L 12/741 | (2013.01) |
| H04L 29/12 | (2006.01) |
| H04L 29/06 | (2006.01) |
| H04W 12/06 | (2009.01) |
| H04W 24/00 | (2009.01) |

(52) U.S. Cl.
CPC ........ *H04L 45/745* (2013.01); *H04L 61/2015* (2013.01); *H04L 63/06* (2013.01); *H04W 12/06* (2013.01); *H04W 24/00* (2013.01)

(58) Field of Classification Search
None
See application file for complete search history.

(56) References Cited

U.S. PATENT DOCUMENTS

| 7,624,181 B2 | 11/2009 | Townsley et al. |
| 7,925,027 B2 | 4/2011 | Kempf et al. |

(Continued)

FOREIGN PATENT DOCUMENTS

| CN | 102739677 A | 10/2010 |
| CN | 101232369 B | 12/2010 |

OTHER PUBLICATIONS

International Search Report and Written Opinion issued in PCT Application No. PCT/US2016/058336, dated Dec. 22, 2016.

(Continued)

*Primary Examiner* — Alpus H Hsu
*Assistant Examiner* — Camquyen Thai
(74) *Attorney, Agent, or Firm* — Workman Nydegger

(57) ABSTRACT

The communication of a network message from a first network node in a particular location to a second network node in a manner that the second network node determines that the network message was processed the network message in the particular location. For instance, the particular location might be a geographic location or a network topographical location. The proof of location is accomplished by using a signed proof of location included by the first network node within the network message. The network message is then received by the second network entity. The second network entity then uses the signed proof of location data structure as input to a process that determines that the network message was processed at least based on the signed proof of location data structure.

19 Claims, 6 Drawing Sheets

(56) References Cited

U.S. PATENT DOCUMENTS

| | | | |
|---|---|---|---|
| 7,984,293 B2 | 7/2011 | Winslow | |
| 8,291,119 B2 | 10/2012 | Rao et al. | |
| 8,387,112 B1* | 2/2013 | Ranjan | G06F 21/57 717/168 |
| 8,566,584 B2 | 10/2013 | Shen et al. | |
| 8,688,834 B2 | 4/2014 | Fujimoto et al. | |
| 2008/0065775 A1 | 3/2008 | Polk | |
| 2009/0276516 A1* | 11/2009 | Ruppert | A63F 13/12 709/224 |
| 2010/0083354 A1 | 4/2010 | Tsirtsis | |
| 2010/0100722 A1 | 4/2010 | Jiang et al. | |
| 2010/0325247 A1* | 12/2010 | Levkowetz | H04L 29/12273 709/220 |
| 2011/0013562 A1* | 1/2011 | Levkowetz | H04W 8/08 370/328 |
| 2011/0087877 A1* | 4/2011 | Dagg | H04L 63/062 713/150 |
| 2011/0093615 A1* | 4/2011 | Novo Diaz | H04L 67/104 709/238 |
| 2011/0099370 A1 | 4/2011 | Shen et al. | |
| 2016/0380776 A1* | 12/2016 | Thubert | H04L 9/3263 713/175 |

OTHER PUBLICATIONS

Second Written Opinion issued in PCT Application No. PCT/US2016/058336 dated Mar. 16, 2017.

International Preliminary Report on Patentability issued in PCT Patent Application No. PCT/US2016/058336 dated Jun. 13, 2017.

Groat, et al., "Privacy and Security of DHCP Unique Identifiers", In International Journal for Information Security Research (IJISR), vol. 1, Issue 3, Sep. 2011, pp. 144-153.

Combes, et al., "Dynamic DNS Update Security, Based on Cryptographically Generated Addresses and ID-Based Cryptography, in an Ipv6 Autoconfiguration Context", In Proceedings of Seventh International Conference on Availability, Reliability and Security, Aug. 20, 2012, 8 pages.

"VMware vCenter Configuration Manager Security Guide", Published on: May 8, 2012 Available at: http://www.vmware.com/pdf/vcenter-configuration-manager-55-security-guide.pdf.

Bi, et al., "SAVI for Mixed Address Assignment Methods Scenario", In Proceedings of Internet-Draft draft-bi-savi-mix-04, Internet Engineering Task Force, Mar. 14, 2011, 10 pages.

Shen, et al., "Enhance IPv6 Dynamic Host Configuration with Cryptographically Generated Addresses", In Proceedings of Fifth International Conference on Innovative Mobile and Internet Services in Ubiquitous Computing, Jun. 30, 2011, pp. 487-490.

Yao, et al., "A CGA Based IP Source Address Authentication Method in IPv6 Access Network", In Proceedings of 33rd IEEE Conference on Local Computer Networks, Oct. 14, 2008, pp. 534-535.

Aura, Tuomas, "Cryptographically Generated Addresses (CGA)", In Network Working Group, RFC3972, Category: Standard Track, Mar. 2005, 22 Pages.

* cited by examiner

LOCATION IDENTIFICATION OF PRIOR NETWORK MESSAGE PROCESSOR

BACKGROUND

Computing systems and associated networks have revolutionized the way human beings work, play, and communicate. Nearly every aspect of our lives is affected in some way by computing systems. The proliferation of networks has allowed computing systems to share data and communicate, vastly increasing information access. For this reason, the present age is often referred to as the "information age".

However, computing networks are often widely distributed and span multiple trust boundaries. For instance, computing systems within a particular corporate boundary may be trusted by that corporation more than computing systems that are outside of that corporate boundary. Furthermore, computing systems within a particular division of a corporation may be trusted more than computing systems within other divisions of the corporation. Accordingly, for proper security, it is important to consider and enforce trust boundaries. Thus, when determining whether to provide a service and/or information to a particular computing system, it is helpful to determine whether that computing system is within a certain trust boundary.

One conventional mechanism for estimating whether a computing system is within a particular trust boundary is based on the source Internet Protocol (IP) address of the message requesting service and/or information. If the source IP address identifies a computing system within the trust boundary, then a certain higher level of trust is allocated to messages received from that computing system. Accordingly, conventional technologies allow computing systems to communicate in a more trusted manner when those computing systems reside in the same trust boundary. Thus, services and information which are predicated on that trust may be mutually offered.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the communication of a network message from a first network node in a particular location to a second network node in a manner that the second network node determines that the network message was processed in the particular location. For instance, the particular location might be a geographic location or a network topographical location. The particular location might include multiple computing systems.

The proof of location is accomplished by using a signed proof of location included by the first network node within the network message. The network message is then received by the second network entity. The second network entity then uses the signed proof of location data structure as input to a process that determines that the network message was processed at least based on the signed proof of location data structure. If the location is trusted, then the second network node may allow certain technical actions to be performed with respect to the received network message.

In one embodiment, the first network entity obtains the signed proof of location data structure from an Internet Protocol (IP) address assignment server that corresponds to a scope of addresses, and that assigns an IP address to the first network entity. The IP address assignment server may negotiate, publish, or otherwise notify the second network entity on how to verify the signature and extract the content of the signed proof of location data structure. Thus, the signed proof of location data structure is at least tamper resistant, if not completely tamper proof. In some embodiments, the signed proof of location data structure may be compared with the IP address associated with the first network node within the network structure, to ensure that they match before the second network node makes the location determination.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Figure 1:
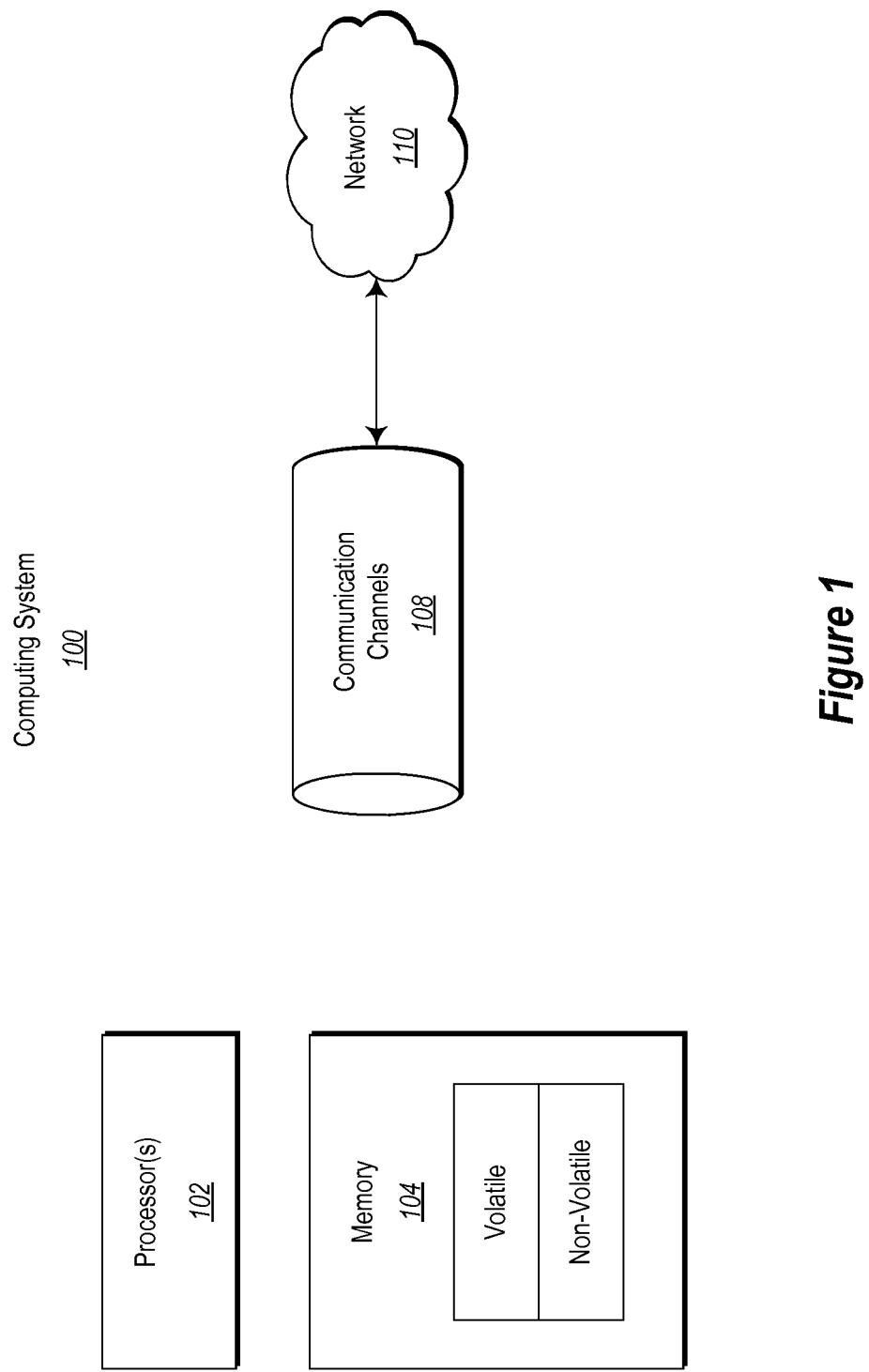
FIG. 1 abstractly illustrates a computing system in which some embodiments described herein may be employed.

At least some embodiments described herein relate to the communication of a network message from a first network node in a particular location to a second network node in a manner that the second network node determines that the network message was processed the network message in the particular location. For instance, the particular location might be a geographic location or a network topographical location. The particular location might include multiple computing systems.

The proof of location is accomplished by using a signed proof of location included by the first network node within the network message. The network message is then received by the second network entity. The second network entity then uses the signed proof of location data structure as input to a process that determines that the network message was processed at least based on the signed proof of location data structure. If the location is trusted, then the second network node may allow certain technical actions to be performed with respect to the received network message.

In one embodiment, the first network entity obtains the signed proof of location data structure from an Internet Protocol (IP) address assignment server that corresponds to a scope of addresses, and that assigns an IP address to the first network entity. The IP address assignment server may negotiate, publish, or otherwise notify the second network entity on how to verify the signature and extract the content of the signed proof of location data structure. Thus, the signed proof of location data structure is at least tamper resistant, if not completely tamper proof In some embodiments, the signed proof of location data structure may be compared with the IP address associated with the first network node within the network structure, to ensure that they match before the second network node makes the location determination.

Some introductory discussion of a computing system will be described with respect to FIG. 1. Then, the communication of a network message from a first network node to a second network node so that the location of the first network node may be determined will be described with respect to subsequent figures.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors (of the associated computing system that performs the act) direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other computing systems over, for example, network 110. The computing system 100 also includes a display, which may be used to display visual representations to a user.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Figure 2:
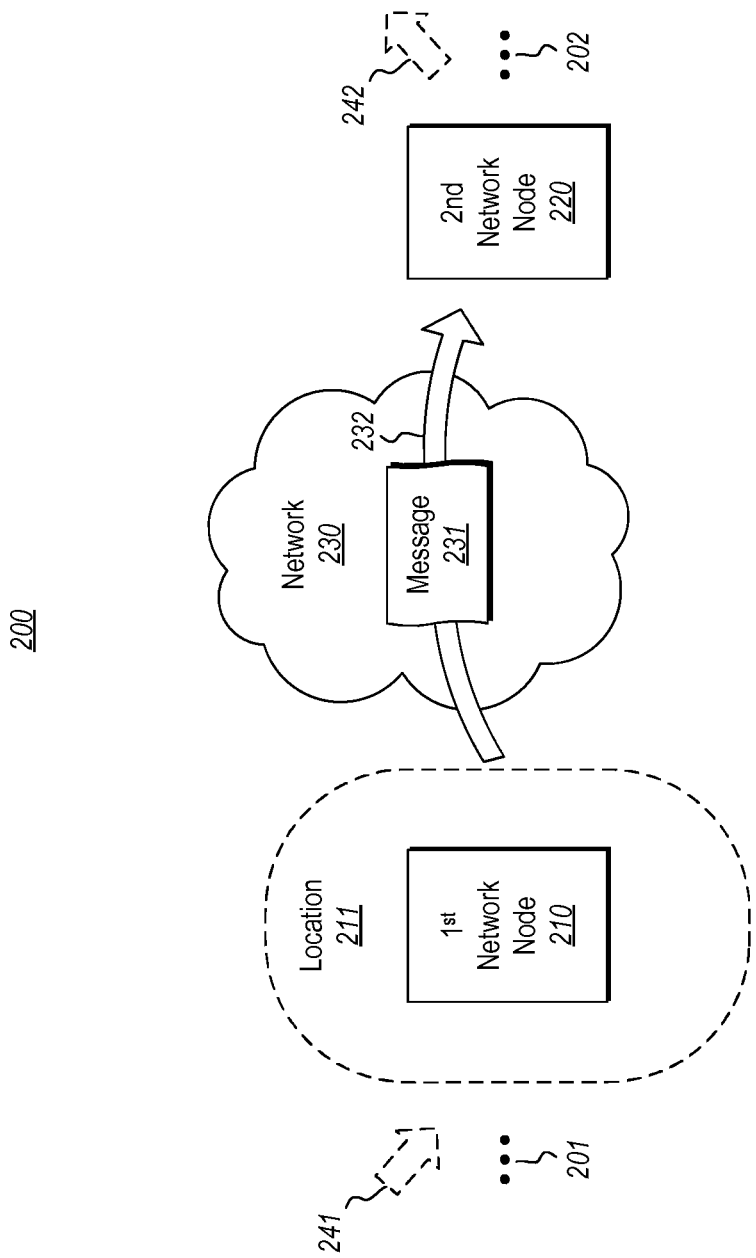
FIG. 2 illustrates an environment that includes a first network node that communicates a network to a second network, and that is within a particular location.

FIG. 2 illustrates an environment 200 that includes a first network node 210 and a second network node 220. The first network node 210 is included within a particular location 211. The first network node 210 communicates a network message 231 (as represented by the arrow 232) over a network 230 to the second network node 220. In accordance with the principles described in further detail herein, the first network node 210 does this such that the second network node 220 is able to confirm that the network message 231 was processed within the particular location 211. If such confirmation is made, then the second network node 220 may perform a technical action or group of technical actions that would not otherwise be performed had the confirmation not been made. For instance, the action may be predetermined, such as the second network node 220 logging the receipt of the message, placing an action associated with the message in a queue, granting all or a portion of a request included within or associated with the message, and so forth. Other actions may be determined contemporaneously, such as actions based on then existing state, load balancing actions, actions that are selected based on some level of random input, and so forth.

The particular location 211 may be a geographic location, which may be defined by any definable geographic boundary. For instance, the geographic location may be defined by political boundaries (e.g., Canada, Kansas, and so forth), by organizational boundaries (e.g., Contoso corporate campus), by construction boundaries (e.g., building 17), or any other definable geographic or physical boundary. The particular location 211 may also be a network topographical boundary. For instance, the location may be defined as encompassing any computing system that is reachable in a particular manner by a particular computing system or set of computing systems using a particular communication protocol.

The network 230 may be any network over which messages may be communicated. As an example only, the network 230 may be the Internet. The network message 231 may likewise be any network message that is structured to be communicated over the network 230. The network message 231 may exist at any level of the protocol stack. For instance, the network message 231 may exist at the Internet layer of the protocol stack such as, but way of example only, an IVp4 message, an IPv6 message, an Internet Control Message Protocol (ICMP) message, an ICMPv6 message, an Internet Group Management Protocol (IGMP) message, a Gateway-to-Gateway protocol message, or any other Internet protocol that is not existing or whether yet to be developed.

However, the network message 231 is not restricted to a message that is recognized at any particular level of the protocol stack. For instance, the network message 231 might alternatively be an application-level message such as a HyperText Transport Protocol (HTTP) message, Transport Layer Protocol (TLP) message, or any other application-level message whether such application or application-level protocol is now existing or whether it is yet to be developed. The network message 231 might otherwise be a message that is recognized at the transport level, the link layer, or any other level of the protocol stack.

The first network node 210 and the second network node 220 may each be any system or device that is capable of communicating the network message 231 over the network 230. For instance, the network nodes 210 and 220 may each be any device or system capable of processing the network message 231. As examples only, the network message may be a client computing system, a server computing system, a gateway, a router, a load balancer, a proxy server, a network address translator, or any other computing device or system. As an example, the first network node 210 and the second network node 220 may each be structured as described above for the computing system 100 of FIG. 1.

In one embodiment, the first network node 210 is the source of the network message 231, and the second network node 220 is the destination of the network message 231. However, in an alternative embodiment, as symbolized by the ellipses 201, the first network node 210 is not the source of the network message 231, but rather receives and processes the network message prior to routing the network message to the second network node 220. The possibility is further symbolized in FIG. 2 by the dotted-lined arrow 241.

Alternatively or in addition, as represented by the ellipses 202, the second network node 220 need not be the destination of the network message 231, but rather receives the network message 231 from the first network node 210, processes the network message 231, and routes the network message 231 further along its path towards the ultimate destination of the network message 220. The possibility is further symbolized in FIG. 2 by the dotted-lined arrow 242.

Figure 3:
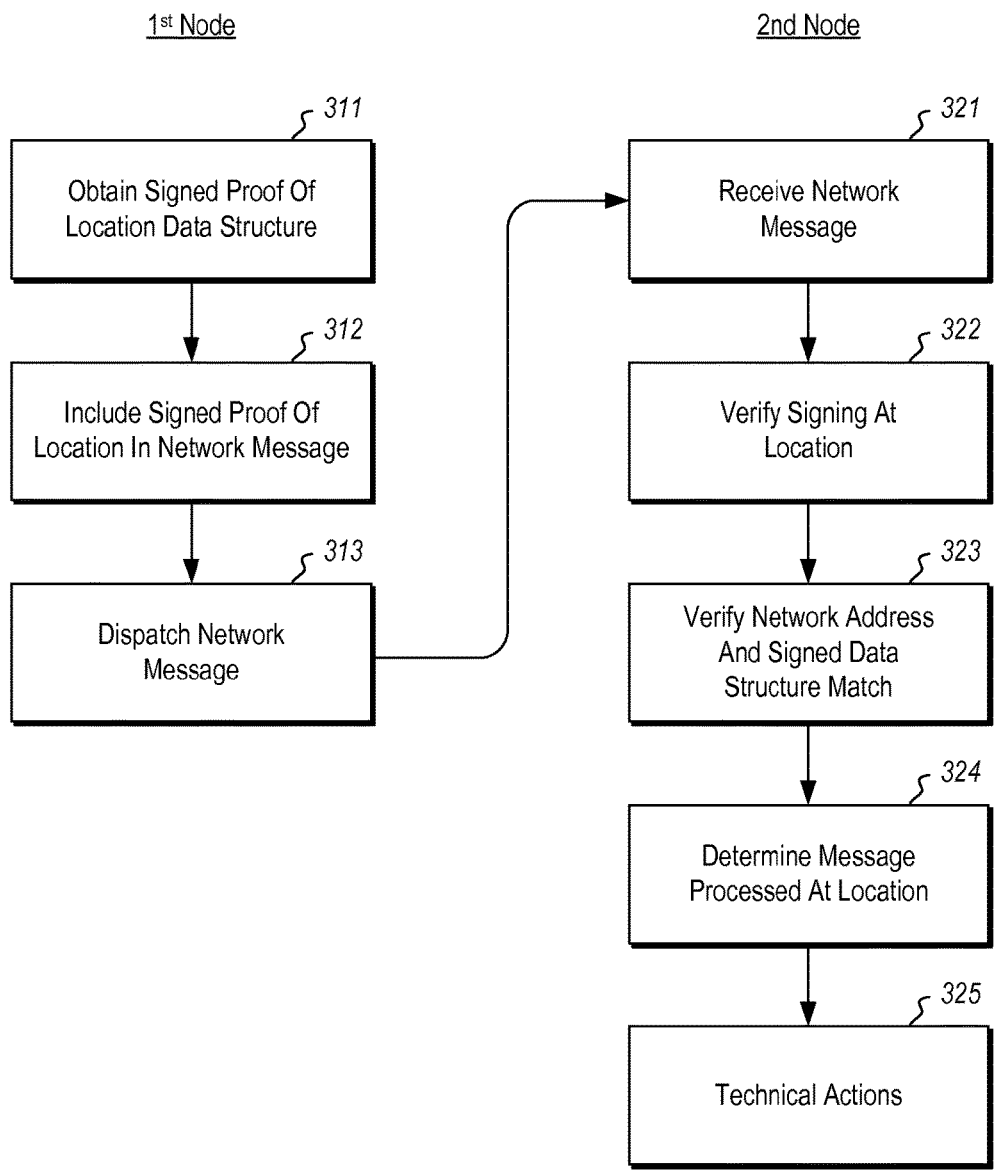
FIG. 3 illustrates a flowchart of a method for a first network node in a location to initiate communicating of a network message to a second network node in a manner that the second network node may determine that a computing system processed the message within the location of the first network node.

FIG. 3 illustrates a flowchart of a method 300 for a first network node in a location to initiate communication of a network message to a second network node in a manner that the second network node may determine that a computing system processed the message within the location of the first network node. Some of the acts of the method 300 may be performed by the first network node 210 of FIG. 2 as represented in the left column of FIG. 3 under the heading "1$^{st}$ Node" and includes acts numbered 311-313. Others of the acts of the method 300 may be performed by the second network node 220 of FIG. 2 as represented in the right column of FIG. 3 under the heading "2$^{nd}$ Node" and includes acts numbered 321-325.

The first network node obtains a signed proof of location data structure corresponding to the location of the first network node (act 311). For instance, the signed location data structure may correspond to the location 211 of the first network node 210 of FIG. 2. More regarding this proof of location data structure will be described further below. Suffice it for now to say that the signed proof of location data structure is structured to be interpretable by the second network node 220 as input to a process of determining that the network message in which the signed proof of location data structure was included was processed by a computing system within the location 211.

Figure 4:
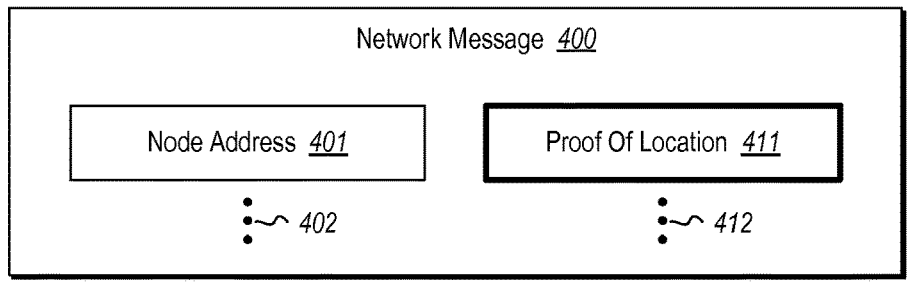
FIG. 4 illustrates a network message that includes a signed proof of location data structure.

The first network node then includes the signed proof of location data structure within a network message (act 312). For instance, FIG. 4 illustrates a network message 400 that includes a signed proof of location data structure 411. The first network node 210 may thus place the signed proof of location data structure 411 within the message 400. The fact that the data structure is signed is represented in FIG. 2 by the element having thicker lines.

Unlike conventional technology, proof of location is not the source IP address itself In fact, network message 400 shows a first network node address 401 of the first network node, that is different than the proof of location data structure 411. As an example, the first network node address 401 may be an IP address of the first network node 210.

As previously mentioned, the first network node 210 may be the source of the network message 400, in which case the first network node 210 also constructs the network message 400. In that case, the proof of location data structure 411 may be placed within the network message 400 as or shortly after the network message 400 is constructed. Furthermore, the network node address 401 would be a source network node address (e.g., a source IP address) of the message 400.

Alternatively, as previously mentioned, the first network node 210 may have received and processed the message 400, and in such processing obtains and places the proof of location data structure 410 within the message 400. In that case, the first network node address may be an intermediate address (e.g., an intermediate IP address) within the message 400.

The first network node then initiates dispatch of the network message (act 313) that includes the signed proof of location data structure to the second network node. For instance, in FIG. 2, the first network node 210 dispatches the message over the network 230 to the second network node 220 as represented by the arrow 231. The message dispatched may be, for instance, the message 400 of FIG. 4 with the included proof of location data structure 410.

In this description, the first network node 210 is described herein as including a single signed proof of location data structure within the network message 400. However, the first network node 210 may perform acts 311 and 312 multiple times to insert multiple signed proof of location data structures in the network message 400. This is symbolized in FIG. 4 using the ellipses 412. The multiple proof of location data structures may be with respect to the same location 411, or may be with respect to different locations that are attributable to the first network node 210. Furthermore, the multiple signed proof of location data structures may be evaluated by the second network node 220 or may each be processed by different network nodes in the path of the network message 231.

Once the second network entity receives the network message (act 321) from the first network entity, the second network node verifies that the signed proof of location data structure was signed in the particular location of the first network node (act 322). For instance, the second network entity 220 verifies that the signed proof of location data structure 411 included within the message was signed within the particular location 211 of the first network node 210.

Furthermore, to further improve security, the second network node determines that the first network node address included within the message is associated with a signature of the signed proof of location data structure (act 323). For instance, the second network node 220 determines that the first network node address 401 is associated with the signature of the signed proof of location data structure 411.

Based on the verification of act 322, or the verifications of acts 322 and 323, the second network node determines that the message was processed by a computing system within the location of the first network entity (act 324). For instance, the second network node 220 determines that the message 400 was processed within the particular location 211.

The second network node may then perform technical actions based on this determination (act 325). As an example, such technical actions might include logging the receipt of the message, placing an action associated with the message in a queue, granting all or a portion of a request included within or associated with the message, and so forth.

While the first network node 210 is described as inserting a signed message into a network message 400, in cases in which the first network node 210 is not the source of the network message, the network message may be received by the first network node 220 already with one or more proof of location data structures contained therein. These one or more other proof of location data structures are also symbolized by the ellipses 412 in FIG. 4. Accordingly, the second network node 202 may perform acts 322 through 324 with respect to each of one, some or all of multiple proof of location data structures contained within the network message with respect to multiple locations in the prior path of the network message.

Figure 5:
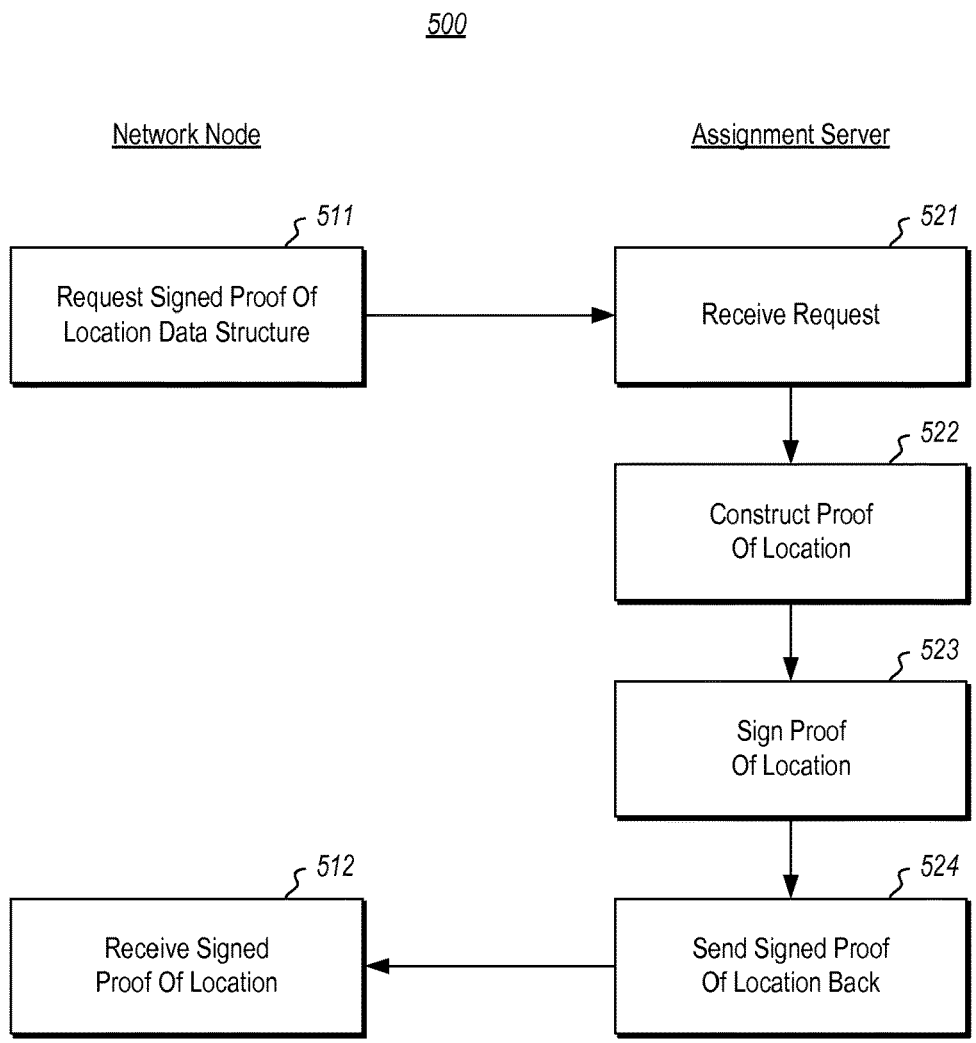
FIG. 5 illustrates a flowchart of a method for the first network node obtaining a signed proof of location data structure.

FIG. 5 illustrates a flowchart of a method 500 for the first network node obtaining a signed proof of location data structure. The method 500 represents one example of how the first network node 210 of FIG. 2 may perform the act 311 of FIG. 3. The method 500 may be performed within an environment 506 of FIG. 6. The environment 600 includes a location 601 that includes an address assignment server 610 (e.g., an IP address assignment server) having an associated address scope 611. The address assignment server 610 is capable of assigning addresses (e.g., IP addresses) from amongst the address scope 611 to any network node within the location 601.

The location 601 also includes multiple network nodes 621 through 624 to which the IP address assignment server 610 is capable of assigning IP addresses. While four network nodes 621 through 624 are illustrated within the location 601, the location 601 may include any number of network nodes as represented by the ellipses 625. Thus, in this case, the location 601 is a network topographical location representing all network nodes that are capable of being assigned an address by the IP address assignment server 610 having the address scope 611.

One of the network nodes 621 through 624 (e.g., network node 621) may be the first network node 210 of FIG. 2. In that case, the location 601 is an example of the particular location 211 of FIG. 2. As previously mentioned, the method 500 of FIG. 5 is for the first network node obtaining a signed proof of location data structure. Furthermore, the method may be performed in the environment 600 of FIG. 6. Acts that are performed by the network node (e.g., the first network node 210—an example of which being the network node 621) are in the left column of FIG. 5 under the header "Network Node" and are labelled 511-512. Acts that are performed by the address assignment server (e.g., the address assignment server 610) are under the header "Assignment Server" and are labelled 521-524.

In accordance with the method 500, the first network node requests that an address assignment server having an associated addresses scope sign a proof of location data structure (act 511). For instance, in FIG. 6, the network node 621 may request that the address assignment server 610 sign and return a proof of location data structure. In an embodiment referred to herein as the "DHCP boot embodiment", the address assignment server is a Dynamic Host Configuration Protocol (DHCP) server, which assigns IP addresses to network nodes when those nodes boot and broadcast a request for an IP address. Accordingly, in the DHCP boot embodiment, the act is performed at the time the network node 210 (e.g., network node 621) boots up from a powered down state. For instance, the request for the signed proof of location data structure may be interpreted from a normal request for an IP address that is broadcast by a network node (and received by the DHCP server) when the network node boots. Thus, the request may be interpreted by the DHCP server as both a request for an IP address as well as a request for a signed proof of location data structure.

Figure 6:
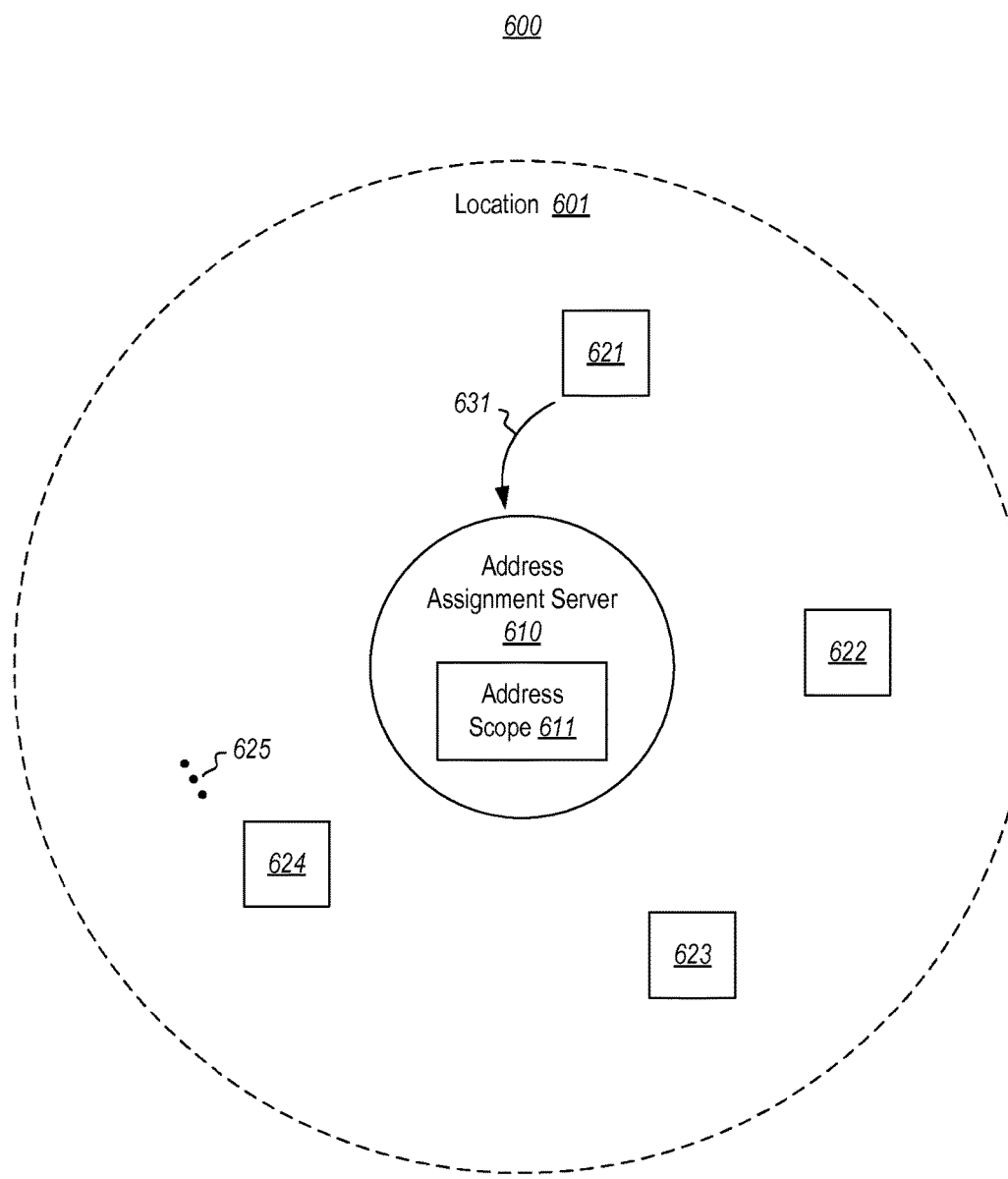
FIG. 6 illustrates an environment that has a location that includes an address assignment server having an associated address scope from which the server may choose to assign addresses to each of a number of network nodes.
Figure 7:
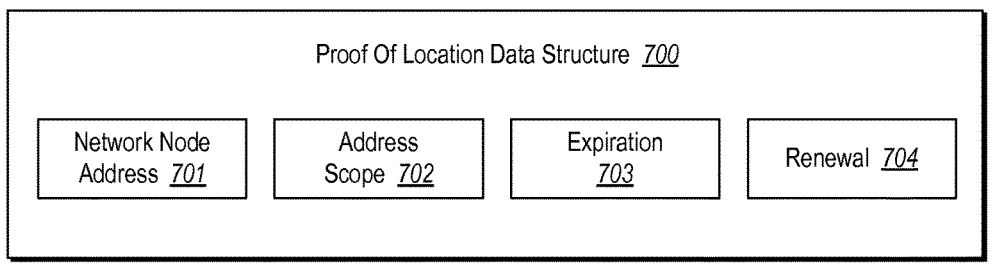
FIG. 7 symbolically illustrates a proof of location data structure.

The address assignment server then receives the request (act 521). This is represented in FIG. 6 by arrow 631. The address assignment server then constructs a proof of location data structure (act 522). FIG. 7 symbolically illustrates such a proof of location data structure 700. The proof of location data structure 700 may include the address 701 assigned to the first network node (e.g., the network node 621), the address scope 702 of the address assignment server 610, the expiration time 703 of the address 701 assigned to the network node, and a renewal time 704 for the address 701 assigned to the network node. In the DHCP boot embodiment, the address 701 may be that address which has been contemporaneously assigned by the DCHP server (an example of the address assignment server 610) from within the address scope 611.

The address assignment server then signs the proof of location data structure (act 523). The proof of location data structure is signed with a signature such that the second network node 520 may extract the proof of location data structure. For instance, the address assignment server 610 and the second network node 220 may have coordinated such that the second network node 220 has a public key associated with a private key held by the address assignment server 610, and which the address assignment server 610 uses to sign the proof of location data structure. The principles described herein are not limited to how this is accomplished. Conventional mechanisms for accomplishing this negotiation include the Public Key Instructure (PKI) system. In that case, perhaps the address assignment server negotiates through that system with each potential subsequent network node to which the first network node 210 might prove its location. Alternatively, the address assignment server may simply publish the public key, in which case the second node 220 may simply acquire that public key prior to or in response to receiving the network message. Such publication might occur using the Domain Name System (DNS) system. Alternatively, the public key may have been included within the proof of location data structure 700.

The address assignment server then sends the signed proof of location data structure back to the first network node (act 524). In the DNS boot embodiment, the address assignment server might also send back the IP address assigned to the network node. For instance, referring to FIG. 6, the address assignment server 610 provides the signed proof of location data structure (along with potentially the assigned address) back to the network node 621 as represented by arrow 631. The first network node then receives the signed proof of location data structure.

With more said regarding how the signed proof of location data structure may be generated, there will now be more description regarding how the verifications of acts 322 and 323 may occur. In order to verify that the proof of location data structure was signed at the location 211, the second network node 220 first trusts that any network node that can be assigned an address from the address assignment server is truly topographically within the same locale. Furthermore, because the second network node 220 has the public key corresponding to the private key used by the address assignment server to sign the proof of location, the proof of location is tamper-proof or at least tamper resistant. That is, if the proof of location cannot be extracted from the signed proof of location data structure using the public key, then the second network node determines that the signed proof of location data structure has been tampered with. Once the second network node extracts the proof of location data structure using the public key associated with the address assignment server, the second network node can then verify that the network node address 701 is truly within the address scope of the address assignment server.

Alternatively of in addition, The second network node 220 does not in advance have possession of the public key corresponding to the private key used by the address assignment server. The signed proof of location data structure 700 in that case either carries the public key, or carries the name of the address assignment service.

Furthermore, for act 323, the second network node verifies that the actual network address 401 included within the network message 411 feasibly belongs within the address scope. The name or public key in the signed proof of location data structure is compared to the set of trusted address assignment servers at the second network node. If a match is found, then the matching public key is considered to be trusted. Signature verification typically involves re-computing the digest of the location information, then processing of the signature value using the public key and finally comparing that to the digest value. The location data structure is, typically, always accessible as plain text. The signature proves that (a) it was issued by a trusted source and (b) it has not been modified in transit. Alternatively, this can be checked by simply verifying that the network address 401 is the same as the network address 701 included within the proof of location data structure, or that the network address is within the scope of the address scope 702 of the data structure. In some embodiments, the address scope 702 need not be placed within the proof of location data structure, but is simply a piece of information that the second network node already determined based on prior negotiations with the address assignment server (e.g., through the DNS system or the PM system). This last verification of act 323 prevents the signed proof of location data structured from being copied from one message to another.

In some embodiments, various processes between the first network node and the second network node may change the network address 401. For instance, load balancers, proxy servers, network address translators, and other processes, may change the network address 401. However, in such cases, the network address 401 is preserved in some other portion of the network message 400 or in aggregations of the network message 400 with other network messages. For instance, suppose that the network message 400 was an IP packet. By aggregating various IP packets, the application-level HTTP message may be recovered. The X-Forwarded- For header of a HTTP message may preserve the network address 401 that would otherwise have been written over by such intermediary process.

As described above, the proof of location data structure may be bound to the first network node 210. This may be accomplished by including a piece of information within the proof of location that is bound to the first network node. For instance, when requesting the proof of location data structure from the address assignment server, the first network node may derive information based on its Trusted Platform Module (TPM). This may be an actual physical TPM resident on the first network node, or it could be TPM software emulation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of providing a location data structure from a first network node in a location to a second network node in a manner that makes the provided location data structure more secure from being tampered with, so that the second network node may use the provided location data structure to determine that a message communicated from the first network node to the second network node has been processed within the location of the first network node, the method comprising:

at the first network node obtaining a signed proof of location data structure corresponding to the location of the first network node, wherein the signed proof of location data structure comprises a signature attached by an address assignment server that verifies that the signed proof of location data structure corresponds to the location of the first network node;

the address assignment server attaches to the proof of location data structure a signature that comprises a private key of a private/public key pair that verifies that the signed proof of location data structure corresponds to the location of the first network node;

the first network node includes the signed proof of location data structure within a message;

the first network node dispatches the message that includes the signed proof of location data structure to the second node;

the second network node receives the dispatched message and the signed proof of location data structure from the first network node;

obtaining at the second network node the public key of the private/public key pair;

using the public key, the second network node extracts the private key and then verifies (i) that the attached signature of the address assignment server matches the location of the first node from which the message was communicated by extracting the private key using the public key, and that (ii) the assigned address is within an address scope of the address assignment server; and as a result of the verification, the second network node determines that the message was processed within the location of the first network node.

2. The method in accordance with claim 1, wherein the first network node originates the message.

3. The method in accordance with claim 1, wherein the first network node receives and processes the message prior to dispatching the message to the second network node.

4. The method in accordance with claim 1, wherein the first network node obtains the signed proof of location data structure comprises:

the first network node requests that the address assignment server associated with the address scope sign the proof of location data structure; and the first network node receives the signed proof of location data structure in response to the first network node's request.

5. The method in accordance with claim 4, wherein the address assignment server is a Dynamic Host Configuration Protocol (DHCP) server.

6. The method in accordance with claim 4, wherein the first network node requesting that the address assignment server sign the proof of location data structure occurs during booting of the first network node.

7. The method in accordance with claim 1, wherein the private key comprises a private signing key portion of a private certificate corresponding to a public certificate that includes a public key portion that contains the associated public key.

8. The method in accordance with claim 1, wherein the address assignment server publishes the public key.

9. The method in accordance with claim 1, wherein the signed proof of location data structure comprises an expiration time associated with the address assigned to the first network node.

10. The method in accordance with claim 9, wherein the signed proof of location data structure further comprises a renewal time associated with the address assigned to the first network node.

11. The method in accordance with claim 1, wherein the message comprises an Internet Protocol (IP) address of the first network node.

12. The method in accordance with claim 1, wherein the location is a geographical location.

13. The method in accordance with claim 1, wherein the location is a network topographical location.

14. A method of using a location data structure to determine that a network message communicated from a first network node in a given location to a second network node has been processed within the given location of the first network node, the method comprising:

at the second network node receiving the network message from the first network node that is within the location, wherein the network message is sent with a signed proof of location data structure, and wherein the signed proof of location data structure comprises an address assigned to the first network node by an address assignment server and an address scope associated with the address assignment server, and wherein a signature is attached to the signed proof of location data structure by the address assignment server, and the attached signature comprises a private key of a private/public key pair that verifies that the signed proof of location data structure corresponds to the location of the first network node;

obtaining at the second network node the public key of the private/public key pair;

using the public key, the second network node extracts the private key and then verifies (i) that the attached signature of the address assignment server matches the location of the first node from which the message was communicated, and that (ii) the assigned address is within the address scope of the address assignment server; and as a result of the verification, the second network node determines that the message was processed within the location of the first network node.

15. A computing system comprising a first network node in a location and a second network node, and comprising one or more processors which, when executing computer executable instructions, cause the computing system to operate with an architecture that performs a method of providing a location data structure from the first network node in the location to the second network node in a manner that makes the provided location data structure more secure from being tampered with, so that the second network node may use the provided location data structure to determine that a network message communicated from the first network node to the second network node has been processed within the location of the first network node, and wherein the method comprises:

a signed proof of location data structure obtained by the first network node, the signed proof of location data structure corresponding to the location of the first network node, wherein the signed proof of location data structure comprises an address assigned to the first network node by an address assignment server and an address scope assigned by the address assignment server, and wherein a signature is attached to the signed proof of location data structure by the address assignment server, and the attached signature verifies that the signed proof of location data structure corresponds to the location of the first network node and serves to make the signed proof of location data structure more secure from being tampered with;

the address assignment server attaches to the proof of location data structure the signature that comprises a private key of a private/public key pair that verifies that the signed proof of location data structure corresponds to the location of the first network node, and wherein the attached signature serves to make the provided proof of location data structure more secure from being tampered with;

the first network node includes the signed proof of location data structure within the network message;

the first network node dispatches the network message that includes the signed proof of location data structure to the second node;

the second network node receives the network message and the signed proof of location data structure from the first network node;

obtaining at the second network node the public key of the private/public key pair;

using the public key, the second network node extracts the private key and then verifies (i) that the attached signature of the address assignment server matches the location of the first node from which the network message was communicated by extracting the private key using the public key, and that (ii) the assigned address is within the address scope of the signed proof of location data structure; and as a result of the verification, the second network node determines that the network message was processed within the location of the first network entity.

16. The computing system in accordance with claim 15, wherein the signed proof of location structure comprises an expiration time associated with the address assigned to the first network node.

17. The computing system in accordance with claim 16, wherein the signed proof of location data structure further comprises a renewal time associated with the address assigned to the first network node.

18. The computing system in accordance with claim 16, wherein the first network node receives and processes the network message prior to dispatching the network message to the second network node.

19. The computing system in accordance with claim 18, wherein receiving and processing the network message prior to dispatching the network message to the second network node comprises including with the network message one or more other signed proof of location data structures from one or more other network nodes, in addition to the signed proof of location data structure obtained by the first network node.

* * * * *